US012433408B2

(12) United States Patent
Ogden

(10) Patent No.: US 12,433,408 B2
(45) Date of Patent: Oct. 7, 2025

(54) FURNITURE HAVING SPANS SUPPORTED BY DOWNWARDLY FLARING POSTS

(71) Applicant: Patsy Ogden, Yorktown Heights, NY (US)

(72) Inventor: Patsy Ogden, Yorktown Heights, NY (US)

( * ) Notice: Subject to any disclaimer, the term of this patent is extended or adjusted under 35 U.S.C. 154(b) by 0 days.

(21) Appl. No.: 19/072,523

(22) Filed: Mar. 6, 2025

(65) Prior Publication Data

US 2025/0280956 A1 Sep. 11, 2025

Related U.S. Application Data

(60) Provisional application No. 63/563,215, filed on Mar. 8, 2024.

(51) Int. Cl.

| | |
|---|---|
| ***A47B 47/00*** | (2006.01) |
| ***A47B 3/06*** | (2006.01) |
| ***A47B 47/04*** | (2006.01) |
| ***A47B 57/32*** | (2006.01) |
| ***A47C 4/02*** | (2006.01) |
| ***A47C 16/02*** | (2006.01) |
| ***F16B 7/02*** | (2006.01) |
| ***F16B 12/44*** | (2006.01) |
| ***F16B 12/58*** | (2006.01) |

(52) U.S. Cl.

CPC .............. *A47C 4/021* (2013.01); *A47B 3/063* (2017.08); *A47B 47/042* (2013.01); *A47B 57/32* (2013.01); *A47C 4/024* (2013.01); *A47C 16/02* (2013.01); *F16B 7/02* (2013.01); *F16B 12/44* (2013.01); *F16B 12/58* (2013.01); *A47B 2230/16* (2013.01); *F16B 2012/446* (2013.01)

(58) Field of Classification Search

CPC ........... A47C 4/02; A47C 4/021; A47C 4/024; A47C 16/02; A47B 2230/07; A47B 2230/16; A47B 3/063; A47B 47/0075; A47B 47/042; A47B 47/00; A45F 5/116; F16B 7/02; F16B 12/44; F16B 12/58; F16B 2012/446

USPC ... 297/16.1, 440.13, 440.15, 440.16, 440.22, 297/423.39, 423.41; 108/149, 151, 159, 108/180, 186, 93; 211/72

See application file for complete search history.

(56) References Cited

U.S. PATENT DOCUMENTS 2,928,554 A * 3/1960 Hyde .................. A47B 47/042 D6/675.3
2,938,633 A * 5/1960 Schmidt ............ A47B 47/0075 108/101

(Continued)

*Primary Examiner* — Robert Canfield

(57) ABSTRACT

At least one furniture upright vertical posts or legs inserted into at least one opening in at least one furniture horizontal span (shelf, top, frame) to retain the span horizontally. Each post diverges from its apex to its base. Each opening is bounded by interior facing walls that diverge downward to complement divergence of the post at an elevated region of the post. The retention of the span at the elevated region of the post arises because of the complementary divergence, which restricts relative movement of the span relative to the post to only allow lifting of the at least one span relative to the at least one post and prevent the span from moving sideways relative to the post at an elevation of the elevated region and prevent the span from being lowered further along the post past the elevated region.

12 Claims, 6 Drawing Sheets

(56) References Cited

U.S. PATENT DOCUMENTS

| | | | | | |
|---|---|---|---|---|---|
| 3,427,074 | A * | 2/1969 | Whyte | A47C 15/006 | 297/451.3 |
| 4,026,220 | A * | 5/1977 | Schuring, Jr. | A47G 7/041 | 211/186 |
| 4,066,295 | A * | 1/1978 | Severson | A47C 7/002 | 297/440.16 |
| 4,119,286 | A * | 10/1978 | Barril | A47C 4/03 | 297/440.16 |
| 4,138,953 | A * | 2/1979 | Tashman | A47B 57/265 | 248/188 |
| 4,262,439 | A * | 4/1981 | Dinan | G09F 7/20 | 40/607.1 |
| 6,123,035 | A * | 9/2000 | Pfister | A47B 87/0223 | 403/309 |
| 6,619,601 | B1 * | 9/2003 | Vall | F16M 11/22 | 248/188 |
| 2005/0133390 | A1 * | 6/2005 | Watson | G11B 33/1493 | 206/307 |
| 2010/0242171 | A1 * | 9/2010 | Polevoy | A47C 19/005 | 5/282.1 |

* cited by examiner

FURNITURE HAVING SPANS SUPPORTED BY DOWNWARDLY FLARING POSTS

CROSS-REFERENCE TO RELATED APPLICATIONS

This patent application asserts the benefit of priority from provisional patent application No. 63/563,215 filed Mar. 8, 2024.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE

Not applicable.

BACKGROUND OF THE INVENTION

1. Field of the Invention

The present invention relates to furniture spans supported by posts.

2. Description of Information Known to the Inventor, Including References to Specific Documents Related to the Invention, and Specific Problems Involved in the State of Technology that the Invention is Drawn Toward Furniture typically has horizontal spans (e.g., shelves, seats, tops) supported by vertical posts (or legs). Assembly of the furniture may require the use of hardware to retain the spans to the posts. Such hardware is exemplified by pegs, brackets, clips, self-supporting pins, hooks and fasteners such as screws. Tools may need to be used to fasten the hardware. Assembly requires that the person who is assembling possess the necessary skillset and dexterity to use tools to secure hardware.

It would be desirable to assemble the furniture without the need to use any hardware and thus without the need to use tools for such hardware. In that way, the homeowner does not need to possess the skillset or dexterity to do so and need not hire a skilled worker to assemble the furniture.

SUMMARY OF THE INVENTION

The present invention relates to furniture assembly without hardware. The furniture may be of any kind, such as a shelving unit, a seating unit or a bed unit.

Shelving units are exemplified by bookcases, bookshelves, wardrobes or wardrobe cabinets, display cabinets, hanging display cabinets, sideboards, chifforobes, standing closets, armoires, almirahs, cupboards, bookcase, chests of drawers, desks, hutches, tables (such as accent tables with shelves, end tables with shelves, console tables) and storage racks. Seating units are exemplified by chairs, sofas, couches, benches, stools, chaise lounges, and chaise sofas. Bed units are exemplified by platform or storage beds storage compartments, bookcase beds, bed headboards, bed footboards. The furniture may be indoor furniture or outdoor furniture.

The assembly relies on the use of self-standing posts that are pyramidal or conical in shape and relies on spans that have openings to accommodate insertion of the posts by lowering the spans onto the self-standing posts. The posts may serve as legs in some cases for the furniture. The spans may serve as shelves, seats or tops in some cases for the furniture. The tops could be desktops, tabletops, cabinet tops or other types of tops for furniture.

Each post has a base and an apex and has an exterior facing surface that diverges or flares outward from the apex to the base. The openings are each bounded by a respective inclined surface of the span that is to be in abutment with a portion of the exterior facing surface of the post after the span has been lowered far enough onto the posts to reach a desired elevation. That desired elevation is typically is lower than the height of the apex and higher than the height of the base with the post standing upright on a flat surface such as a floor. The span is retained at the elevation because of the abutment, which restricts relative movement of the span with respect to the post by blocking the span from moving sideways subsequently and from being further lowered subsequently as the post remains upright. The span is configured to become freed of the abutment only from lifting of the span relative to the post as the post remains upright in the self-standing position.

The manner of supporting spans by the posts in accordance with the invention may be applied to any piece of furniture that is characterized by having horizontal and vertical extending components. The spans are horizontal and might be boards used for shelving, tabletops, desktops, seat frames (for chairs, stools, benches) and bed headboards/footboards.

BRIEF DESCRIPTION OF THE DRAWING

For a better understanding of the present invention, reference is made to the following description and accompanying drawings, while the scope of the invention is set forth in the appended claims.

DETAILED DESCRIPTION OF THE INVENTION

Figure 1:
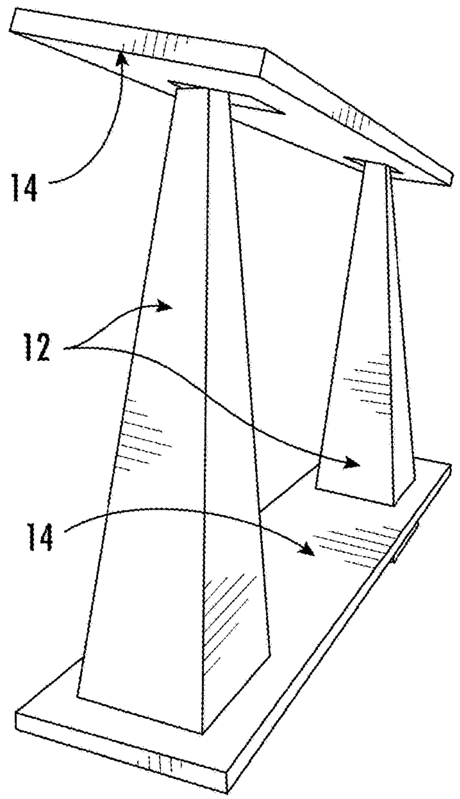
FIGS. 1-3 are progressive isometric views showing assembly of a shelving unit by lowering a shelf onto two posts in accordance with the invention until reaching an elevation along the posts where the shelf can be lowered no further.

In the case of a shelf unit 10 of FIGS. 1-6, there are a plurality of posts 12 each diverging downwardly (or flaring out downwardly) and at least one span 14. Each span 14 may be a board or plank or made from any other material strong enough to support items typically placed on shelves. Each span has an opening 16 whose inclined interior facing walls diverge to complement a divergence at a portion of the exterior surface of the post 12 that is fitted through the opening 16. The shelf unit 10 could have any number of posts. In the case of a corner shelving unit, there may be three or four posts for instance.

Figure 10:
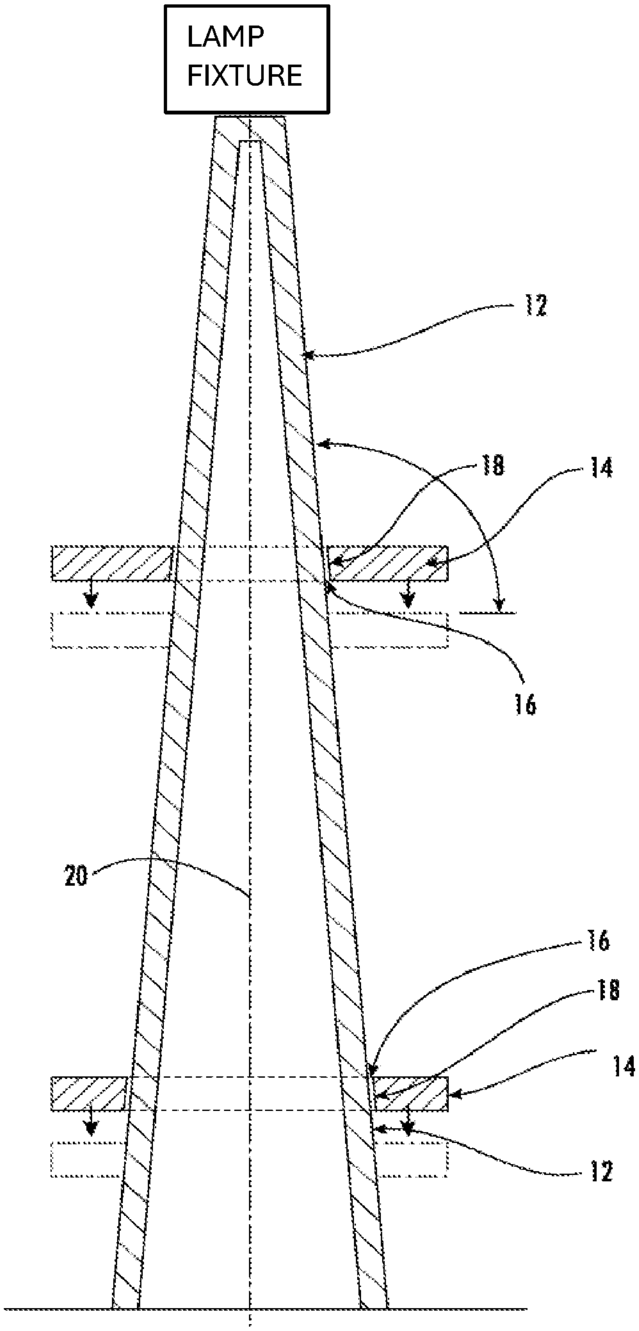
FIG. 10 is a floor lamp with a lamp fixture atop the hollow post of FIG. 7.

In the case of a floor lamp of FIG. 10, a single post 12 supports a lamp fixture preferably at its apex and the single post is hollow to accommodate an electric cord (not shown) for passing electricity to the lamp bulb (not shown). Unlike conventional floor lamps, however, the floor lamp of the present invention is readily converted to include shelving by supporting shelves 14 at different elevations along the length of the post 12 with each shelf 14 having a different size opening 16 than the others. The post 12 and the shelf spans 14 may be made of any material, whether the material be, for instance, wood, stone, laminate, marble, granite, quartzite, soapstone, or travertine.

In the case of a table or desk (not shown but may be envisioned from FIG. 7), each leg of the table or desk constitutes a corresponding one of the posts 12 and the span 14 is the tabletop or desktop but with openings 16 to accommodate insertion of respective ones of the posts 12. The table or desk has additional shelving that can be supported by the posts 12.

Figure 8:
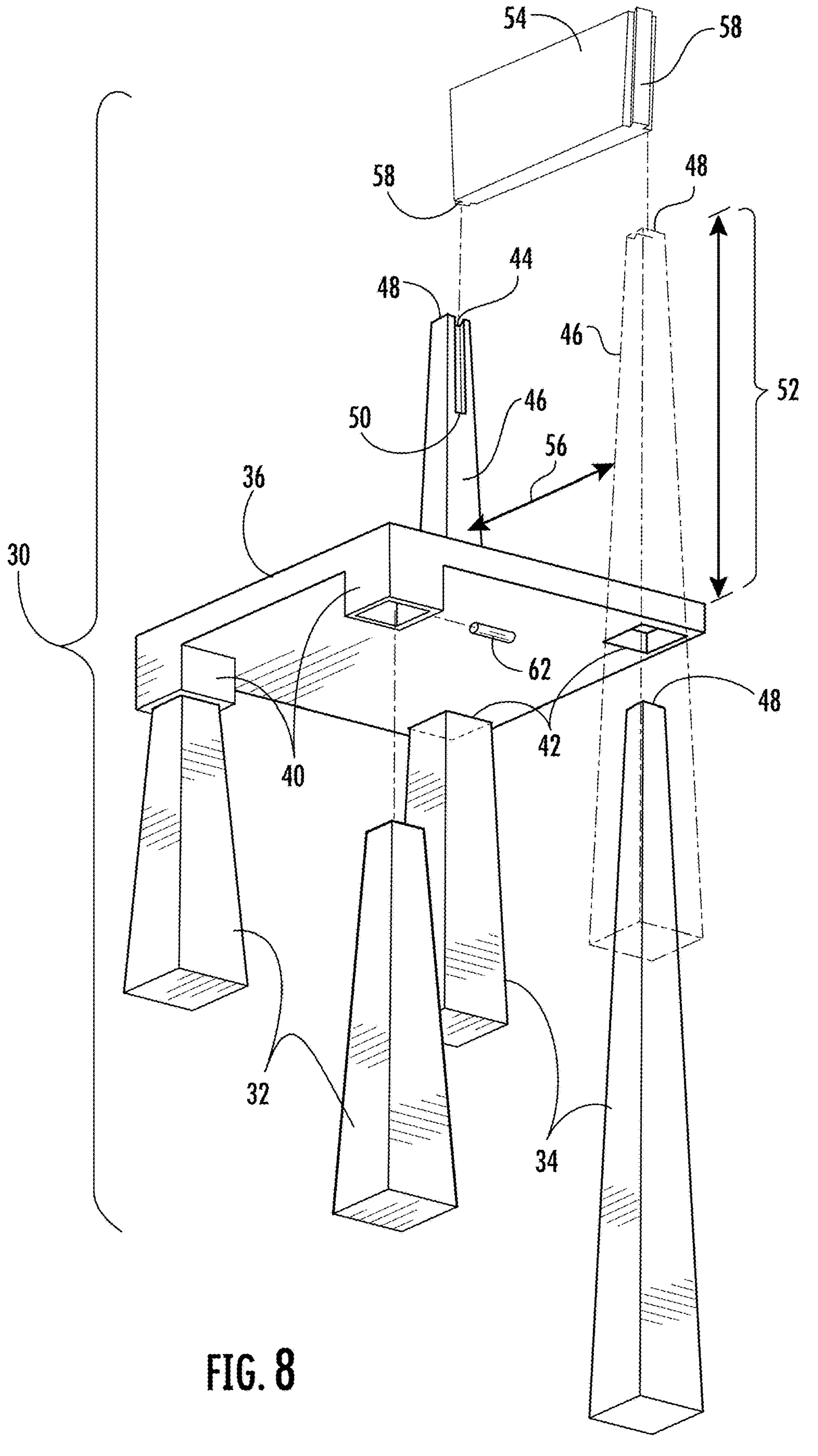
FIG. 8 is an isometric view of a seating unit in accordance with a further embodiment.
Figure 9:
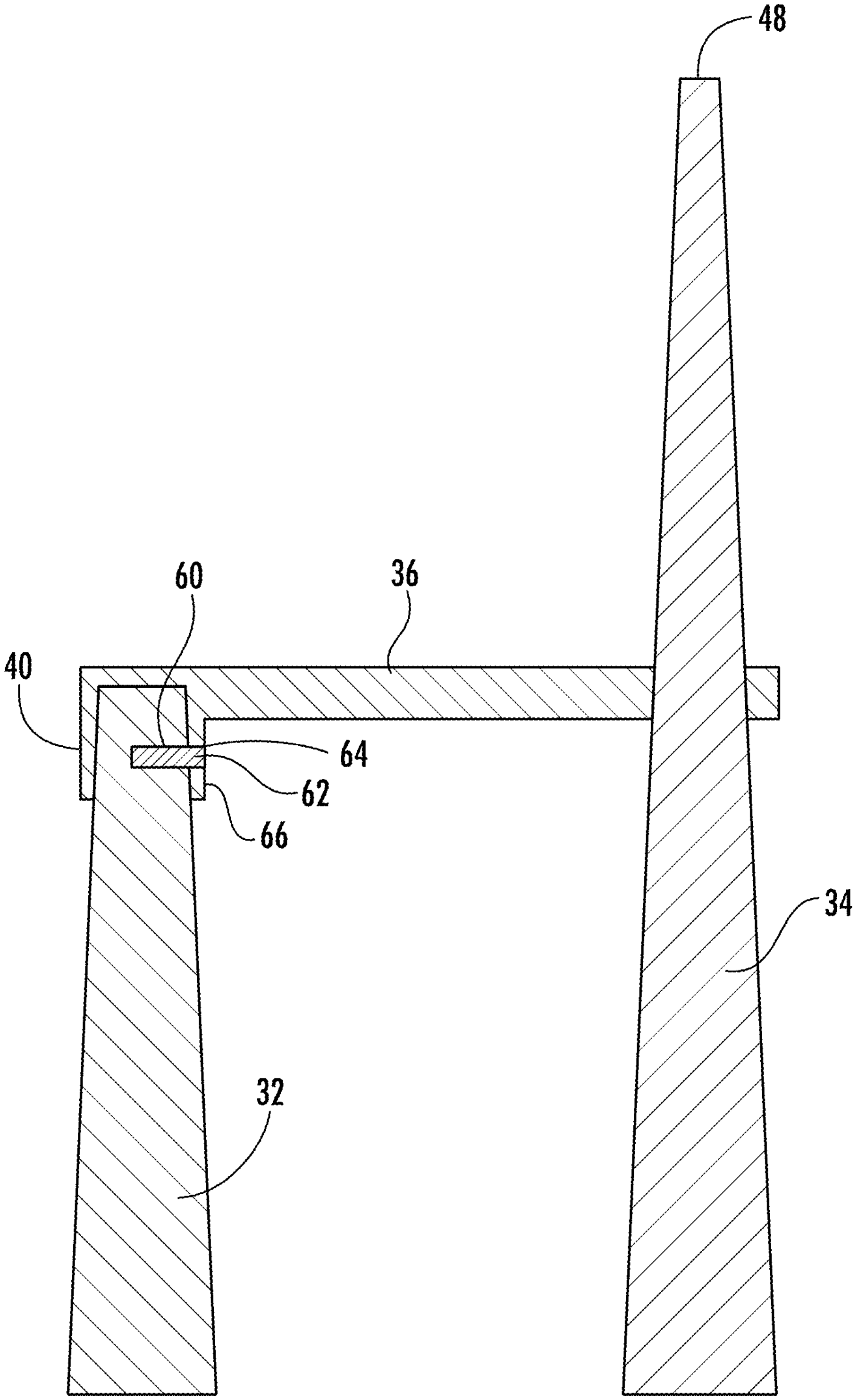
FIG. 9 is a cross-section of the seating unit of FIG. 8 across section lines 9-9.

In the case of a chair of FIGS. 8-9, a rear chair leg constitutes one of the posts 12. Two of such rear legs extending through openings in the seat, which constitutes the span 14, so as to have a portion extending above the seat that can support a backrest between. Two front legs, which are shorter than the two rear legs that also retain the backrest, are secured to the underside of the seat.

Each span 14 may be made of any material, such as wood, stone, laminate, marble, granite, quartzite, soapstone, or travertine.

The downwardly diverging posts 12 may be conical or pyramidal. They may be hollow or solid or partially hollow and partially solid. The spans 14 have multiple openings corresponding to the number of posts needed to assemble the unit. The posts are inserted into respective openings of the spans to support the spans. Once in place on the posts and supported at a particular elevation, the spans 14 have restricted relative movement because of the abutment of the span surface that bounds the openings with a portion of the exterior surface of the posts. The spans 14 can only be subsequently lifted or raised upward relative to the posts to free themselves of the abutment, which blocks the spans from moving sideways or from being lowered further.

An advantage of the present invention is that it is self-standing and its assembly is carried out on site without the need for any tooling or fastener hardware or adhesives. Instead, the bases of the posts 12 are first positioned on a floor in upright positions and spaced apart from each other by a separation distance equal to the distance between the center of openings in the span 14. Next, the span 14 is then raised over the posts 12 and lowered onto them until the width of the posts 12 at predetermined elevations is wide enough to retain the span 14 in position. In the case of the posts 12 supporting multiple spans 14 as would be the case for supporting shelves of a shelving unit 10, the dimension of the set of openings 16 in each span 14 differs from span to span so that spans 14 with the larger size openings are retained at lower elevations along the posts 12 than are the spans 14 with smaller size openings.

Retention of at least one span 14 at 1n elevated region of at least one post 12:

(a) arises as the inclined, interior facing walls 18 that bound the openings 17 make contact with the exterior inclined surface of the posts 12 at an elevated region,
(b) restricts relative movement of the at least one span 14 relative to the at least one post 12 to only allow lifting of the at least one span 14 relative to the at least one post 12,
(c) prevents the at least one span 14 from moving sideways at the elevated region relative to the at least one post 12,
(d) prevents the at least one span 14 from being lowered past the elevated region of the at least one post 12, and
(e) takes place without any hardware or adhesives being present and thus no tooling is required to retain the at least one span 14 with the at least one post 12, which extends vertically.

The units may be customized to suit the needs of a customer. For instance, the customer may want to have the spacing between shelves be uniform or to differ. Once the desired elevations for each of the shelves is provided, the shelves can have custom size openings made that correspond with the dimension of the posts at the desired elevations.

FIGS. 1-4 illustrate in succession how a shelf span 14 is positioned onto the two upright, self-standing posts 12. To assemble the shelf-unit 10, the shelf span 14 is initially raised above the posts 12 and then lowered onto them with the openings 16 of the shelf span 14 in alignment with the two posts 12. To disassemble, the shelf span 14 is raised upward until clear of the upright posts 12.

Figure 2:
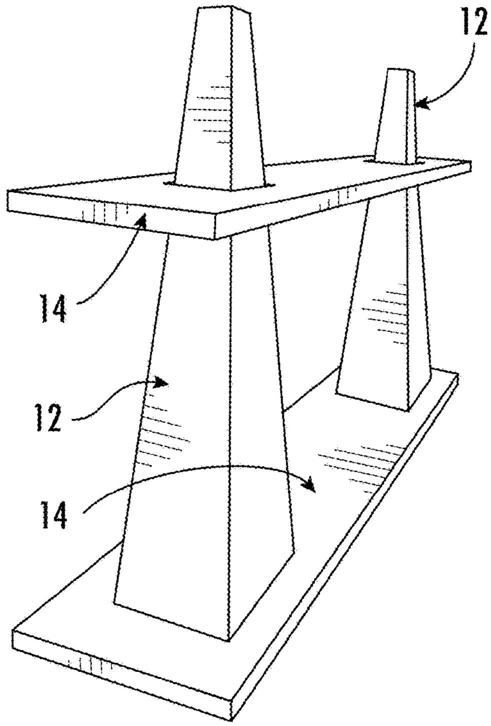
Figure 3:
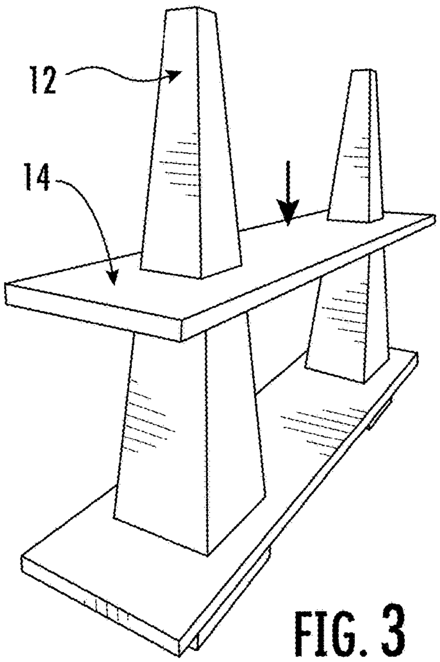
Figure 4:
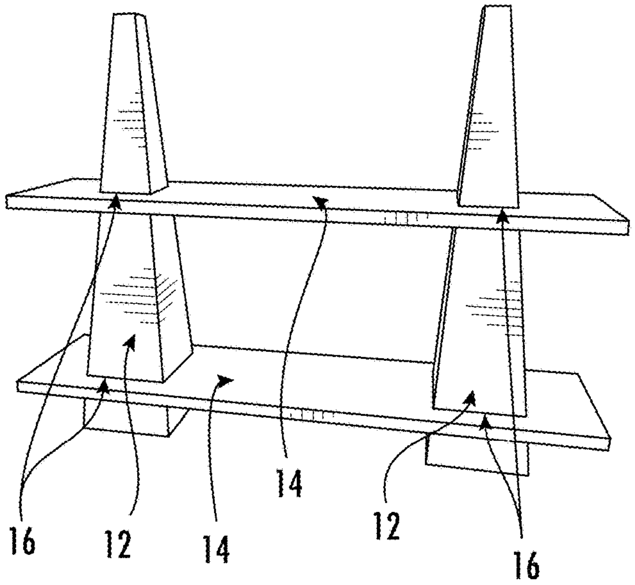
FIG. 4 is an isometric view of FIG. 3 as viewed from a different angle than in FIG. 3.

FIG. 1 shows the position of the shelf span 14 over the self-standing, upright, posts 12 with the openings 16 in the shelf span 14 aligned with the apex of each of the two self-standing, upright posts 12. FIG. 2 shows the effect of lowering the shelf spans 14 onto the self-standing, upright posts 12. FIG. 3 shows the shelf span 14 reaching its elevation position along the upright posts 12 where it will be supported by the upright posts 12. FIG. 4 shows the shelf span 14 supported at the desired elevation by the upright posts 12. In effect, the shelf span 14 extends in a plane perpendicular to that of a plane passing through centerlines 20 of the two upright posts 12.

Figure 5:
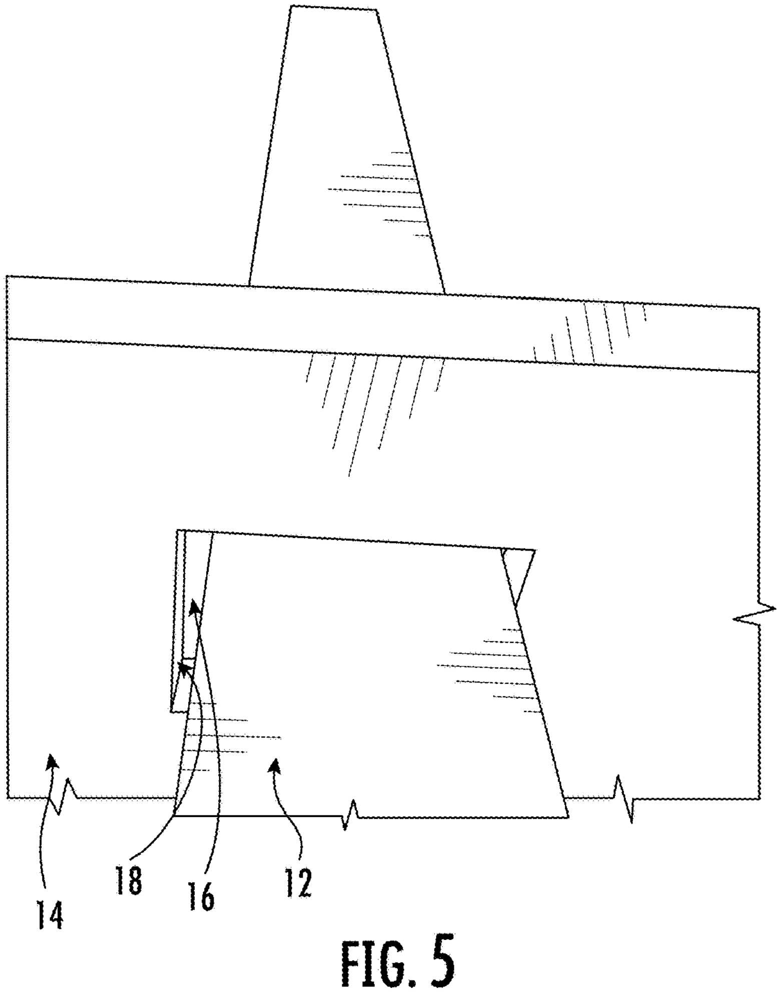
FIGS. 5 and 6 are isometric views from the underside of the span into whose opening a post is being inserted.
Figure 6:
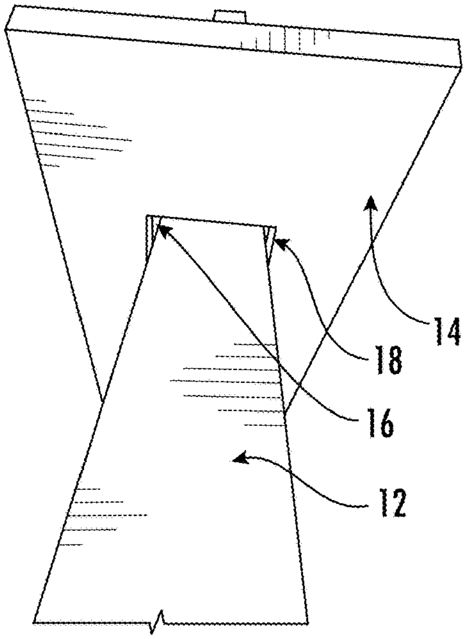

FIGS. 5 and 6 show the shape of the opening 16. Inclined interior facing falls 18 of the shelf span 14 bound the opening and are slightly beveled to complements the inclined shape of the exterior surface of the upright post 12. That is, the inclined, interior facing walls 18 diverge in a like manner to the divergence of the upright post 12.

The assembly works best when the two upright posts 12 diverge downwardly or flare out increasingly toward the base, that is, they have a conical or have a pyramidal shape. A pyramidal shape is a three-dimensional structure encompassing a polygon as its base. In accordance with the invention, the polygon may be a triangle, square, a rectangle, a pentagon, a hexagon, a heptagon, an octagon or other polygonal shape. If desired, there may be more than two upright posts, such as three or four, preferably equally spaced apart. There could be three posts in the case of a corner unit or there could be four posts in the case of a longer full-length wall version.

In case where the posts are pyramidal, the openings are beveled to complement the downward divergence of the pyramid post for a desired elevation where the shelf is to be supported. Each post diverges from its apex to its base symmetrically about its longitudinal centerline 20.

While the set of openings 16 for a particular shelf span 14 will have the same dimension so that the particular shelf extends horizontal at a corresponding elevation when supported on the upright posts 12, the dimension of each opening 16 in the set of openings of other shelves will not be the same as that of the set of openings for the particular shelf span 14. Instead, their openings 16 will be of a smaller dimension if they are to be supported at higher elevations along the posts and will be of a larger dimension if they are to be supported at lower elevations along the posts than where the particular shelf is to be supported at a corresponding elevation.

Figure 7:
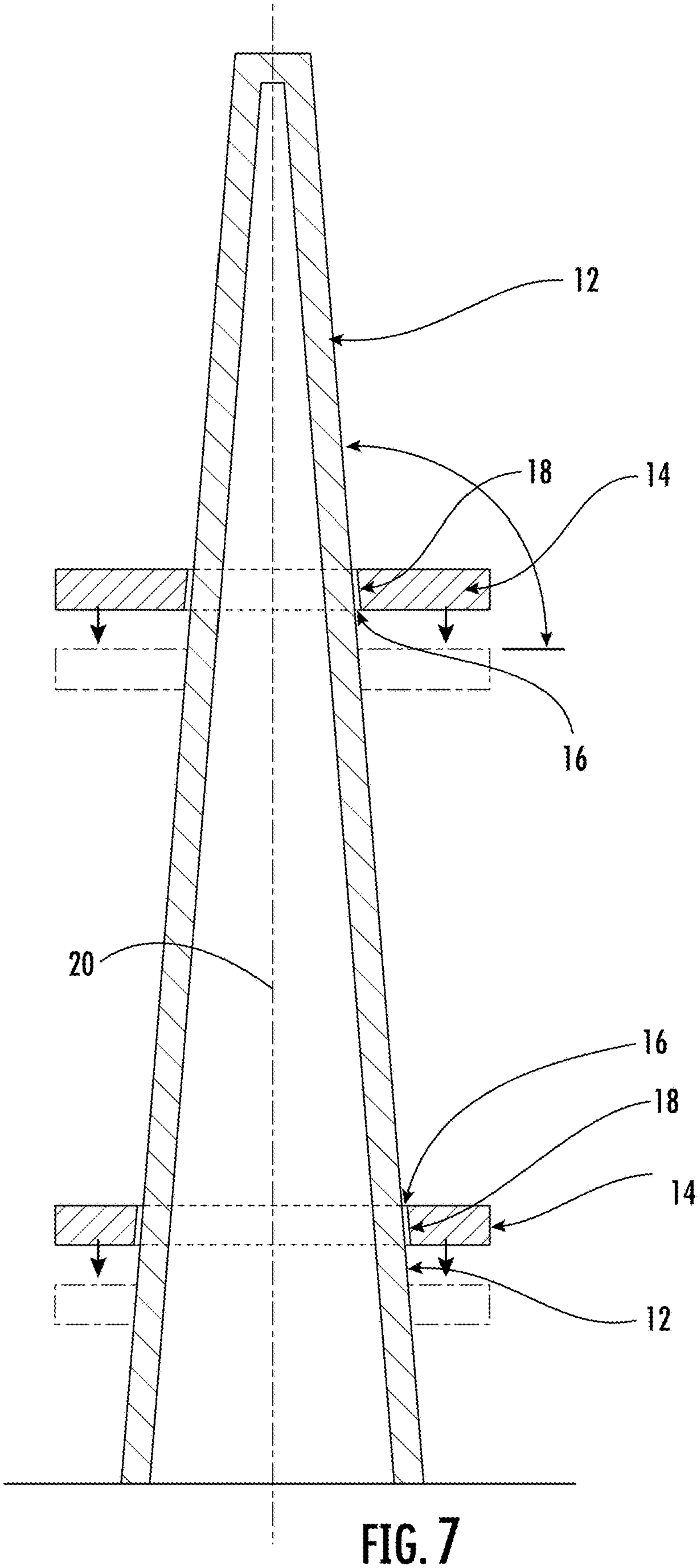
FIG. 7 is a cross-section of the assembly of FIG. 4 as viewed from an end of the shelving unit.

FIG. 7 shows the shelving span 14 supported by the upright pyramidal posts 12. Each post 12 may be hollow. When in position, the shelf spans 14 preferably extend in a horizontal plane that is perpendicular to a vertical plane passing through vertical centerlines 20 of the upright pyramidal posts 12. Thus, the configuration shown in FIG. 7 may be part of any kind of furniture that has horizontal spans supported by vertical posts (or legs), such as a floor lamp unit with shelving, a wardrobe cabinet, a display cabinet, a hanging display cabinet, a sideboard, a cabinet, a bookcases, a shelving unit, a table, a desk, a chair, a platform bedframe with storage, a bed headboard, a bed footboard. The horizontal spans might be boards used for shelving, cabinet tops, tabletops, desktops, chair frames, platform bedframes with storage, and bed headboards and bed footboards.

FIGS. 8 and 9 show the manner of assembling a seating unit such as a chair 30 in accordance with the invention. A pair of front legs 32 are shorter than a pair of rear legs 34. A chair seat 36 has an underside 38 with a pair of depending sleeves 40 at the two front corner regions of the seat 36 and has a pair of downwardly diverging or flaring, inclined surfaces that bound the openings 42 at the two rear corner regions of the seat 36.

The two rear legs 34 each have a respective groove 44 along the center of respective surfaces 46 that face each other. Each groove 44 extends from the apex 48 or top of the rear legs 34 and continues downward about midway 50 of the distance 52 that the rear legs 34 extend over the seat 36 when fully assembled. A backrest 54 is provided that extends the width of a gap 56 that spaces the upper portions of the two rear legs 34 apart from each other and has respective tongues 58 that fit into respective ones of the grooves 44 when the backrest 54 is slid into position between the upper portions of the two rear legs 34. The grooves 44 and tongues 58 are in effect female and male members whose shapes complement each other.

With respect to the two front legs 32, each is held secure in place within confines of respective ones of the sleeves 40 by having a respective recess 60 into which is fitted a respective peg 62 that extends via a slot 64 in a rearward facing surface of each of the sleeves 40. It is anticipated that during assembly, the two front legs 32 are secured in place to the underside of the seat 36 first by the pegs 62 being inserted into the slots 64 and recesses 60 all in a friction fit manner. Next, the two diverging openings at the rear of the seat 36 are fitted onto the two longer legs 62 (rear legs/backrest support) and then the backrest 54 is slid into position until the tongues 58 are fully inserted into the respective grooves 44. As the seat 36 slides down on the rear chair legs 62 from above past the two female members or grooves 44 and the backrest 54 is put in place, the seat 36 is then slid completely down and doing so would lock the seat 36 in place.

It should be understood that the same technique for attaching legs to an underside of a horizontal span applies also to some kinds of stools, benches, desks and tables whose legs elevate the horizontal span (stool seat, bench seat, desktop, or tabletop) above the ground. If desired, shelves may also be provided to extend horizontally between a pair of the legs in a like manner tot that shown in FIGS. 1-7.

As an alternative, the front legs 32 may be secured to the underside of the seat 36 using any conventional technique. For instance, the exterior side facing region adjacent the top of each of the front legs 32 and the inside facing surface of the sleeves 40 may have complementary screw threads to enable the front legs 32 to be screwed into place within the sleeves 40 and retained by engagement of the screw threads with each other.

Although not shown, the bedding unit is analogous to the seating unit in that that backrest of the seating unit would be replaced by a headboard of a bed and the seat of the seating unit would be replaced by the platform of a platform bed. The legs of the seating unit would not be replaced by legs for the platform bed but instead would be used to support the headboard between the two posts and perhaps shelving such as for a bookcase bed or perhaps to support shelving for a storage bed.

While the foregoing description and drawings represent the preferred embodiments of the present invention, various changes and modifications may be made without departing from the scope of the present invention.

What is claimed is:

1. A self-standing furniture unit; comprising:

a post extending through an opening in a span in a self-standing position, the post having a base and an apex and having an exterior facing surface that diverges from the apex to the base to define a geometric shape selected from the group consisting of a cone and a pyramid, the opening being bounded by an inclined surface that is in abutment with the exterior facing surface of the post at an elevation that is lower than the apex and higher than the base as the post stands upright so that the apex is higher than the base, the span being retained because of the abutment at an elevation, the abutment restricting relative movement of the span with respect to the post by blocking the span from moving sideways subsequently and from being further lowered subsequently as the post remains upright, wherein the span is configured to become freed of the abutment only from lifting of the span relative to the post as the post remains upright in the self-standing position, the abutment lacking any hardware or adhesives.

2. The self-standing furniture unit of claim 1, further comprising:

a combination floor lamp and shelving unit that has the post extending through the opening in the span, the post being hollow, the span constituting a shelf.

3. The self-standing furniture unit of claim 1, further comprising:

a unit that has the post extending through the opening in the span, the span constituting a shelf and having a further opening that is identical to the opening through which extends the post; and a further post identical to the post that extends into the further opening, the further post extending through the further opening in a like manner to the post extending through the opening.

4. The self-standing furniture unit of claim 3, wherein the unit is selected from group consisting of a shelving unit, a bedding unit and a seating unit.

5. The self-standing furniture unit of claim 1, further comprising:

a seating unit having a backrest and having a seat supported by two rear legs and two front legs, the span constituting the seat and the post constituting one of the two rear legs, the two rear legs each being symmetrically identical with each other and being longer than each of the two front legs, the seat having another opening into which extends another of the two rear legs so that the two rear legs extend through respective openings in the seat, the two rear legs being configured to retain the back rest between portions of the two rear legs that are at elevations higher than the seat as the two front legs and two rear legs rest on a flat surface, the backrest and the portions of the two rear legs having complementary engaging surfaces that engage to retain the backrest in position between the portions of the two rear legs.

6. The self-standing furniture of claim 5, wherein the seating unit is selected from a group consisting of a chair, a bench, a sofa, a couch, a chaise sofa, a chaise lounge, and a stool.

7. The self-standing furniture of claim 5, wherein the seat has an underside from which extends a pair of sleeves each with a slot, the two front legs each having aperture and being fitted into respective ones of the sleeves to align neighboring ones of the slots and apertures, further comprising:

pegs extending into aligned ones of the slots and apertures to retain the front legs to the underside of the seat.

8. The self-standing furniture of claim 5, wherein the seat has an underside from which extend a pair of sleeves each with a respective opening, the two front legs each having a respective end region complementary to that of the respective opening—so as to enable retention of the two legs to the the pair of sleeves via insertion of the respective end region of each of the two legs into the respective opening of each of the two sleeves.

9. A method of assembly a self-standing furniture unit; comprising:

extending a post through an opening in a span in a self-standing position, the post having a base and an apex and having an exterior facing surface that diverges from the apex to the base to define a geometric shape selected from the group consisting of a cone and a pyramid, the opening being bounded by an inclined surface that is in abutment with the exterior facing surface of the post at an elevation that is lower than the apex and higher than the base as the post stands upright so that the apex is higher than the base; and retaining the span because of the abutment, at an elevation, the abutment restricting relative movement of the span with respect to the post by blocking the span from moving sideways subsequently and from being further lowered subsequently as the post remains upright, wherein the span is configured to become freed of the abutment only from lifting of the span relative to the post as the post remains upright in the self-standing position.

10. The method of assembling the self-standing furniture unit of claim 9, further comprising:

providing a seating unit having a backrest and having a seat supported by two rear legs and two front legs, the span constituting the seat and the post constituting one of the two rear legs, the two rear legs each being symmetrically identical with each other and being longer than each of the two front legs, the seat having another opening into which extends another of the two rear legs so that the two rear legs extend through respective openings in the seat; and retaining the backrest between portions of the two rear legs that are at elevations higher than the seat as the two front legs and two rear legs rest on a flat surface, the backrest and the portions of the two rear legs having complementary engaging surfaces that engage to retain the backrest in position between the portions of the two rear legs.

11. The method of claim 10, further comprising:

securing the two front legs into sleeve that extend from an underside of the seat, the backrest being retained between the portions of the two rear legs after the two rear legs extend through the respective openings in the seat.

12. The method of claim 11, wherein the seat has an underside from which extends a pair of sleeves each with a slot, the two front legs each having aperture and being fitted into respective ones of the sleeves to align neighboring ones of the slots and apertures; and extending pegs into aligned ones of the slots and apertures to retain the front legs to the underside of the seat.

* * * * *